US006003060A

United States Patent [19]
Aznar et al.

[11] Patent Number: 6,003,060
[45] Date of Patent: Dec. 14, 1999

[54] METHOD AND APPARATUS TO SHARE RESOURCES WHILE PROCESSING MULTIPLE PRIORITY DATA FLOWS

[75] Inventors: Ange Aznar, La Colle sur Loup; Jean Calvignac, La Gaude; Daniel Orsatti, Cagnes s/Mer; Dominique Rigal, Nice; Fabrice Verplanken, La Gaude, all of France

[73] Assignee: International Business Machines Corporation, Armonk, N.Y.

[21] Appl. No.: 08/993,695

[22] Filed: Dec. 18, 1997

[30] Foreign Application Priority Data

Dec. 20, 1996 [EP] European Pat. Off. .............. 96480124

[51] Int. Cl.$^6$ ...................................................... G06F 9/00
[52] U.S. Cl. ............................................ 709/103; 709/102
[58] Field of Search ..................................... 709/100, 102, 709/103, 104, 106, 107; 348/17; 395/500.17

[56] References Cited

U.S. PATENT DOCUMENTS

| | | | |
|---|---|---|---|
| 4,491,947 | 1/1985 | Frank | 370/323 |
| 5,390,184 | 2/1995 | Morris | 370/353 |
| 5,528,513 | 6/1996 | Vaitzblit et al. | 709/103 |
| 5,608,651 | 3/1997 | Leavy et al. | 348/17 |
| 5,701,441 | 12/1997 | Trimberger | 395/500.17 |
| 5,825,662 | 10/1998 | Trimberger | 395/500 |
| 5,838,954 | 11/1998 | Trimberger | 395/500.17 |

*Primary Examiner*—Majid A. Banankhah
*Attorney, Agent, or Firm*—Scully, Scott, Murphy & Presser

[57] ABSTRACT

The invention discloses a method and an apparatus for use in high speed networks such as Asynchronous Transfer Mode (ATM) networks providing support for processing multipriority data flows at media speed, the major constraint being to share the storage and the ALU between all the tasks. The invention consists first in grouping the tasks in processes and the processes in set of processes all organized in decreasing order of their priority ; 'on the fly' interruption of a lower priority process/set of processes by a higher priority process/set of processes is possible as well as reuse of the shared resources during task void states inactive in a process or between processes.

In the preferred embodiment of the invention, the support of the reserved bandwidth and non reserved bandwidth ATM services data flows requires two different groups of processes, the highest priority being for the group of processes serving the reserved bandwidth service.

With the principle of the invention when used in network equipment the media speed is sustained and many different network traffics can be simultaneously supported. The apparatus implementing the solution of the invention, allowing sharing of resources saves place and costa by the improved reduced number of sophisticated hardware components such as static memories and programmable logic circuits.

10 Claims, 7 Drawing Sheets

Scheduling for RB and NRB traffic

METHOD AND APPARATUS TO SHARE RESOURCES WHILE PROCESSING MULTIPLE PRIORITY DATA FLOWS

BACKGROUND OF THE INVENTION

1. Technical Field

This invention relates in general to networking communication system and more particularly to network node attachment cards for high speed packet networks such as Asynchronous Transfer Mode (ATM) networks.

2. Prior Art

High speed networks generate problems of performance and hardware integration in the networking equipment connected to their network lines. More particularly, in the physical network lines attachment cards, the network data flows are processed at media speed before being sent to the bus of a network equipment such as a switching node or a end station.

In Asynchronous Transfer Mode (ATM) networks the attachment cards provide the physical layer and the ATM forwarder function which includes ATM processing and routing as defined in the ATM Forum specifications published by the Technical Committee.

In a network node, these problems become more crucial for implementing the support of the different types of services guaranteed to their users by the high speed network providers. At connection establishment, the user chooses between services supported by the network. Inside the network node attachment cards to connections corresponding to the different services will generate different levels of priority data flows to be processed at media speed.

This is why there is an emerging need to have in the high speed network equipment attachment cards as implementation of the multipriority processing with high performance to guarantee the quality of service. Simultaneously to this need, these equipment require hardware integration and cost saving in regards respectively with the decreasing size of equipment and the price of the hardware components. This implies the usage of designs allowing the implementation of processing sustaining the media speed while sharing hardware resources.

One constraint in network equipment attachments id the sharing between all the processes of the control blocks created at connection establishment storing connection information; these connection control blocs cannot be duplicated for evident reasons of space and cost. However, some hardware design duplicate the Logic Sections (Arithmetic and Logic Units) when more than one level of priority id to be supported for processing. As one ALU is needed per level of priority, this solution is quite expensive and does not offer a satisfying level of integration. Two other solutions for processing multipriority data flows with one ALU can be found in the network equipment today, one is the 'dedicated processing without interruption', the other one is a 'comprehensive' processing. The drawbacks of the 'dedicated processing without interruption' appears when a higher priority process needs to become active; it has to wait up to the completion of the lower priority process which is active. The performance if such a solution is not acceptable. One improved solution is a 'comprehensive processing' which allows 'on the fly' interruption of a lower priority process by a higher priority process. When a running process is interrupted 'on the fly' by a higher priority process, the working data are saved. In a more complex processing environment, the higher priority tasks may comprise active and non-active states, each state corresponding to one clock cycle. Nonactive or void state are lost cycles during which a result is computed or information are fetched, these operations having been started during the previous active state. As process cycles are lost, this solution is to be improved.

It is an object of the invention to provide an optimized solution for processing prioritized data flows.

It is a second object of the invention to simplify the implementation in order to have a limited number of components in a hardware implementation of the invention allowing hardware integration.

SUMMARY OF THE INVENTION

The present invention discloses a method for processing multipriority data flows according to claim 1.

The invention also discloses an apparatus for multipriority data flow processing according to claim 5 and network adapters comprising such an apparatus.

More particularly, the method and the apparatus of the invention can be used for ATM networks.

The strength of the energy cascading mechanism resides in the fact that a process or a set of processes can be started as soon as required and fully independently of the status, active or idle, of all other processes. Each step of this process when started is executed according to its clock enable signal in turn function of the relative position of said process in regard to the other started ones. This allow a higher priority process in regard to already started ones at a given time, to start and effectively access the shared resources instantaneously. This principle provides a protection of the priority flows; it also allows a process to still get energy, through its clock enable signal, even if several higher priority processes are active. This is the case if said processes are currently and simultaneously in a void state. This scheme maximizes the number of simultaneous candidates for the access of shared resources (potentially all processes) and hence maximizes the use of the shared resources and thus improving an overall node efficiency.

BRIEF DESCRIPTION OF THE DRAWINGS

Preferred embodiments of the present invention will now by described, by way of example only, with reference to the accompanying drawings, in which.

DETAILED DESCRIPTION OF THE PREFERRED EMBODIMENT

The preferred embodiment discloses the processing of ATM cell information data flows in the ATM layer of the ATM network adapters. It is noted that the information data flow processed in this preferred embodiment comprises cell control information only, namely the cell header and the cell address, even if the same method and apparatus described here can apply to entire cell data flow processing. In the case where the entire cell is processed, reception and transmission data movement operations are part of the data flow processing: in the preferred embodiment reception and transmission data movement are not considered. The outgoing data flow consists in cell information such as ATM routing/forwarding information. The ATM layer as defined in the ATM Forum performs ATM cell switching. The multipriority cell information data flows processed are data packet flows. Each cell information data processed is related to an ATM connection, itself related to a specific ATM service; for this reason to each connection data flow correspond a level of priority. For instance, the highest priority ATM data flow corresponds to the connections having a bandwidth reserved at connection setup (RB traffic for Reserved Bandwidth traffic). A lower level of priority applies to the connections sharing the bandwidth available (NRB traffic for Non Reserved Bandwidth traffic). The processing of multipriority cell information data flows needs access to the information on the related ATM connection stored as Connection Control Blocks; it also needs access to Logic sections (ALUs) performing operations such as counting of cells. These computing resources (ALUs and Connection Control Blocks) cannot be duplicate for each data flow priority level for evident reasons of costs and real estate for the hardware implementation.

Figure 1:
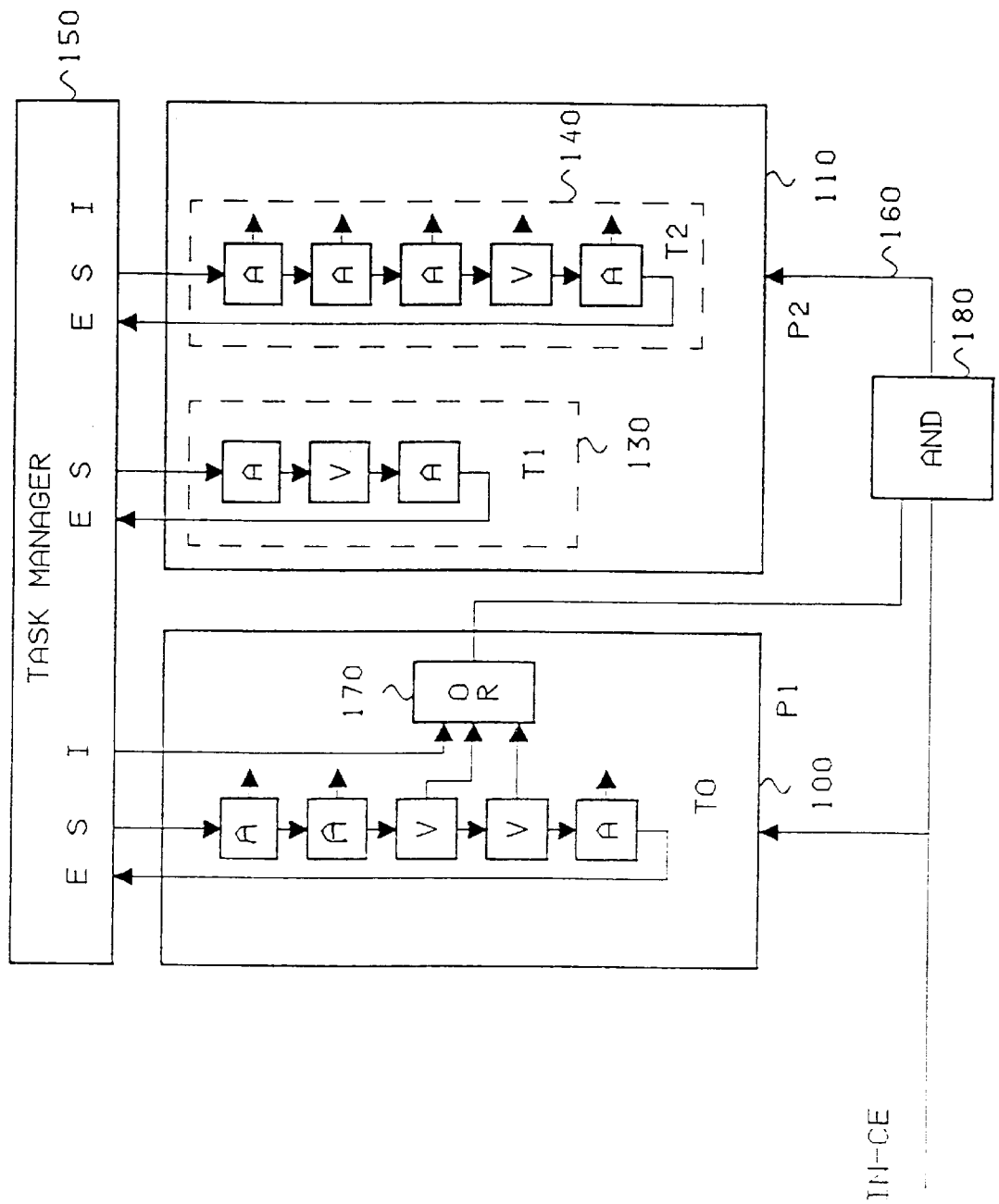
FIG. 1 describes the energy cascading mechanism between processes.

FIG. 1 describes the energy cascading mechanism for distributing clock cycles ('energy') to concurrent processes operating simultaneously. Basically, tasks (defined by successive steps) are accessing the same ALU and the same storage resources; they are activated (Start command) by a Task Manager (150). The task manager starts the task according to its own algorithm of selection : task priorities, alternate processing based on Round Robin algorithm etc. . . . The tasks are characterized by sequential states (finite state machine-FSM). Each state can be either active (A) i.e. accessing the shared resources (e.g. external storage) or void (V) i.e. not active but not accessing the shared resources. An example of void state is when a task has to wait the result of a previous READ operation of the external storage, in order to derive which is the further action. In this case, the fixed time required to get the data from the storage is implemented by void states. Active states require energy for execution, meaning that until such a cycle occurs, the task remains in the same state. Void states which only represent a time delay are completed after one clock cycle even if no energy is provided. In each task, move from an active state to the subsequent state is done when its clock enable signal is active; move from a void state to the subsequent one is done automatically with the system clock.

Each process comprises one or more tasks but only one task is started at a given time. One example of task grouping in one process is when these tasks need all to access common data. In the example of FIG. 1, the process PR2 includes two tasks, T1 (130) and T2 (140). The processes, PR1 and PR2 in the figure, can run concurrently. A one-task process such as PR1 becomes active when the task (T0 ) is started by the Task Manager (150). In the case of a process encompassing several tasks e.g. T1 and T2 in PR2, starting the process means starting one task of the process, with respect to the algorithm of task selection of the Task Manager.

The principle of the energy cascading mechanism illustrated in FIG. 1 is for distributing the energy with the clock enable signal at a first level between processes. The processes have different levels of priority. In FIG. 1, the higher priority process, P1, receives the incoming clock enable signal $IN_{13}$ CE, that represents all the cycles available. The second process in terms of priority, P2 receives as clock enable signal (160), a signal representing the clock cycles of IN_ if P1 process is idle (Idle line command from the Task Manager)or the clock cycles of IN_not used by the P1 process when it is active i.e. during its void states. The OR (170) of the idle lineout of the process manager with the void states of P1 represents the inactivity of the P1 process. ANDing (180) said inactivity with the P1 opportunities i.e. IN_, gives the new opportunities of the P2 process. Consequently to the energy cascading mechanism, a process can be started as soon as required and fully independently of the status, active or idle, of all other processes. Progression of this process when started is function of its clock enable signal in turn function of the relative position of said process in regard to the other ones. This allow a higher priority process in regard to already active ones at a given time, to start and effectively access the shared resources instantaneously. This principle provides a protection of the priority flows; it also allows a process to still get energy, through its clock enable signal, even is several higher priority processes are active. This is the case if said processes are currently and simultaneously in a void state. This scheme maximizes the number of simultaneous candidates for the access of shared resources (potentially all processes) and hence maximizes the use of the shared resources and thus improving an overall node efficiency.

Figure 7:
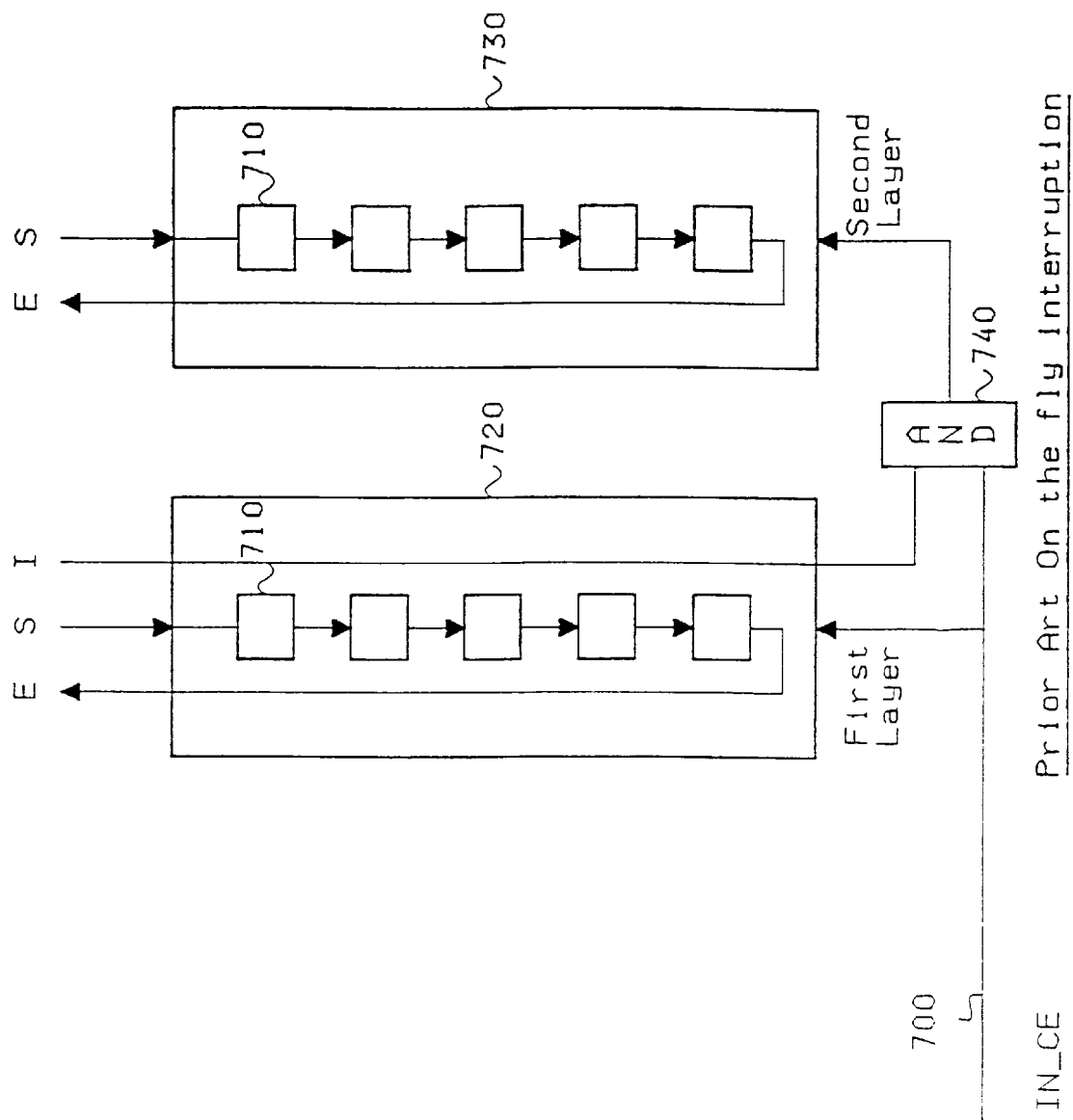
FIG. 7 shoes the 'on the fly' interruption solution of the prior art.

FIG. 7 illustrates the implementation of the present invention reduced to the 'on the fly' interruption principle which can be found in the prior art. The only level of interruption is performed by the highest priority task (first layer 720) on the lowest priority task (second layer 730) at the end of any state (710). The Void states of the tasks (710) are not re-used by a higher priority task. The 'energy' provided by the clock enable signal 'IN_CE' (700) is used for the lowest priority task only if the highest priority task is idle (I signal entering the AND 700 port).

Figure 2:
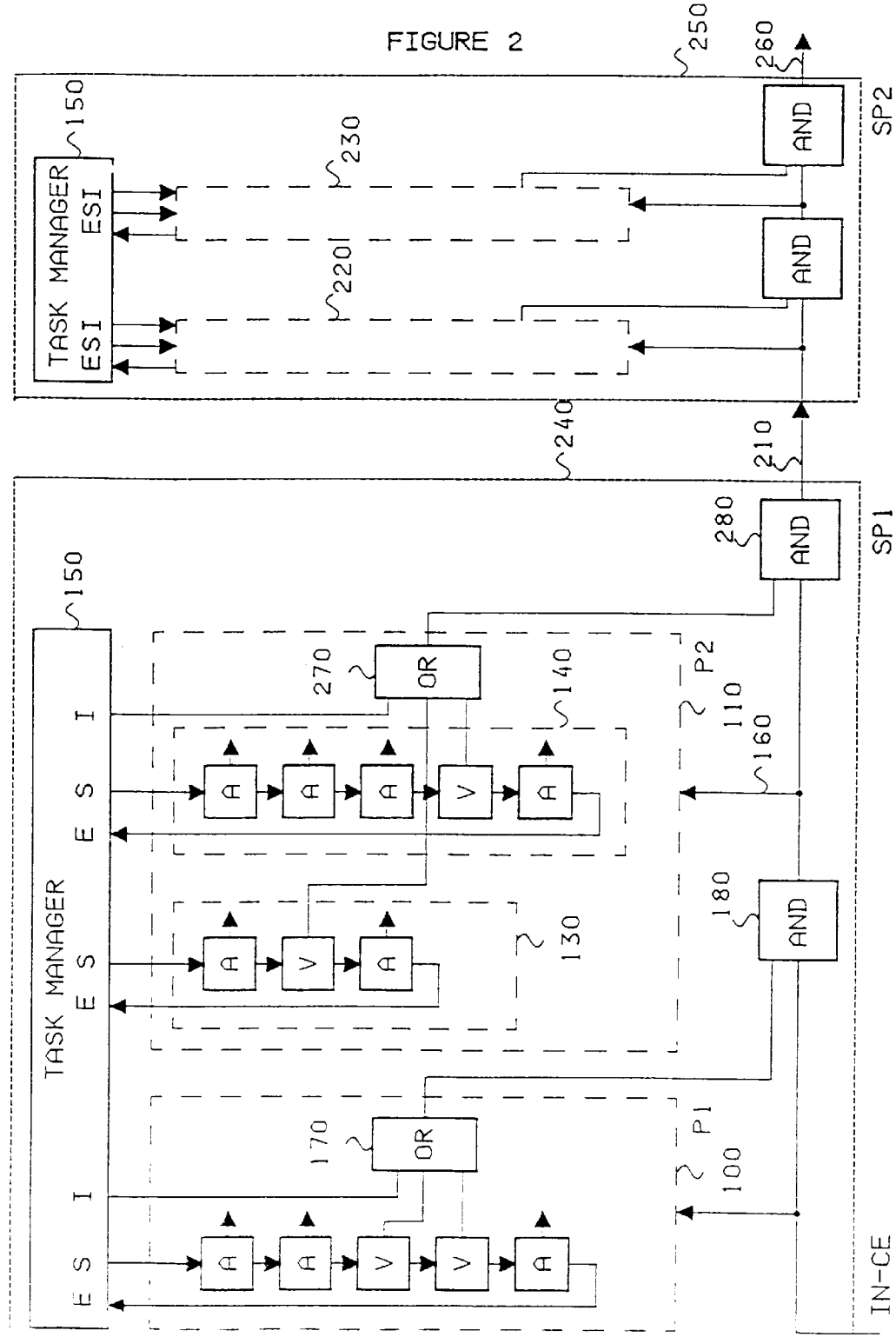
FIG. 2 shows the energy cascading mechanism between sets of processes.

FIG. 2 shows how the energy cascading mechanism can apply, at a second level, between set of processes. The processes can be logically grouped by 'set of processes' and hierarchized according to different levels of priority. In a telecommunication adapter receiving a network data flow comprising different kinds of traffic flows, prioritized sets of processes correspond to the different prioritized traffic flows processing. In FIG. 2, a second set of processes, SP2 (250) is added to the first set of processes, SP1 (240) comprising the processes of FIG. 1 (100, 110). The set of processes SP2 has two processes, 220 and 230, whose tasks are not detailed. The energy cascading scheme operates between set of processes in a similar way as it operates between processes inside a same set of processes: set of processes have to be hierarchically placed and the energy a set of process gets is derived from the energy of the upstream priority set of processes and from the inactivity of said upstream set of processes. In FIG. 2, the set of process SP2 has a lower priority than SP1. The energy available for SP2 i.e. the working cycles of SP2 (210) in FIG. 2, results from the energy (AND 180 output) of the lowest priority process of SP1 i.e. P2 not used by said P2 process. Practically, 'unused' is obtained by ORing (270) all the idle states of the tasks of process P2 and the idle state of process P2 (out of the SP1 manager). ANDing (280) the available cycles of P2 process with the OR (270) output gives the new available cycles for the subsequent set of process, SP2. Energy cascading within SP2 is similar as within SP1 (FIG. 1 description); similarly, energy cascading from SP2 to a subsequent set of processes (subsequent interms of priority) is similar to energy cascading from SP1 to SP2. We understand that in FIG. 1, the higher priority process, PR1, receives the incoming clock enable IN_CE, that represents all the cycles available for the whole set of processes. (If the shared resources are used only by said whole set of processes then IN_ is the system clock. However, if the External Storage is only one part of a storage holding other data, then, the whole set of processes accessing the External Storage part of the storage gets only a fraction of the system cycles).

Figure 3:
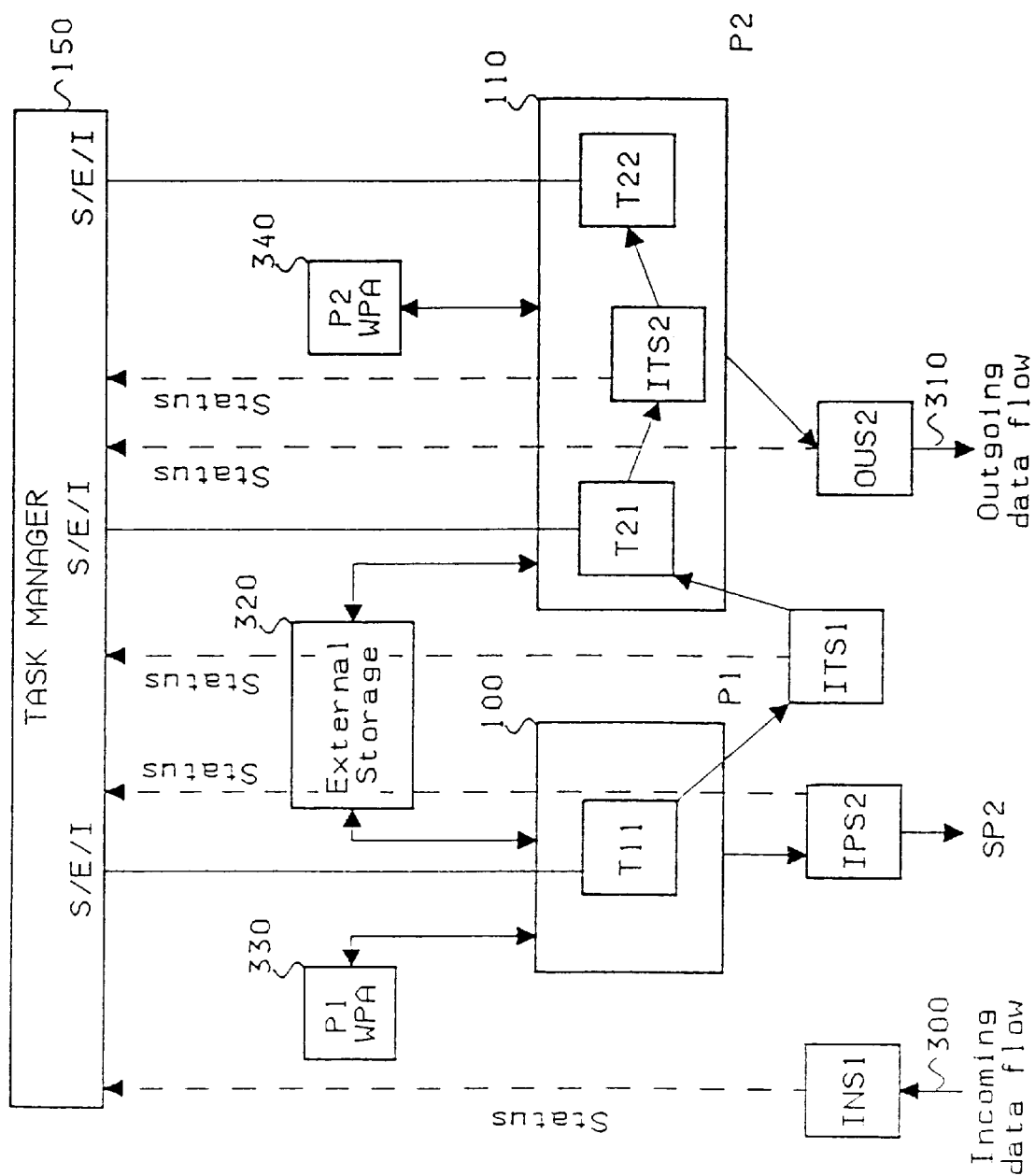
FIG. 3 illustrates the communication areas between tasks and processes of a same set of processes processing a data flow and sharing storage resources.

FIG. 3 depicts the storage organization for communication between tasks and processes of one set of processes, SP1 of FIG. 2. The set of processes an incoming data flow (300) into the outgoing processed data flow (310) or towards another process (for instance SP2 of FIG. 2), under the control of the Task Manager (150). The processing stream in the set of processes in FIG. 3 consists in the execution of the ordered tasks from T11 to T22 (from left to right on FIG. 3), grouped in 2 different processes P1 (100) and P2 (110). However, a partial data process can also be done if the processing stream stops after execution of Task T11 in process P1. The incoming packet flow at media speed is stacked in an Input Stack (INS1). In the case where the processes are communicating data to each other the data is stacked in Inter Process stacks (IPS). IPS2 is the communication stack for process P1 and process P2, P2 process being external to the process structure considered in this example. The same kind of stack can be also placed between two Tasks, then called an Inter Task Stack (ITS). ITS1 is the communication task used for communication between task T11 and Task T21; ITS1 is for communication between tasks T21 and T22. The processed flow is stacked in an output task (OUS). These IPS, ITS OUS INS stacks have separate Read and Write ports which buffer a data packet accessible from the parts ( respectively process, task) two processes, one filling the stack (using Write Port), the other emptying it (using READ port), then allowing each part to run asynchronously. In the preferred embodiment, flip-flops are used as 'minimum' stacks between processes and tasks, unless the process time is greater than the available data unit (packet) process time according to media speed. The use of flip-flops allows for instance two processes to be simultaneously active. Upon reception of a complete incoming data packet, INS1 status lines inform the Task Manager that next process can be started. The Task T1 in the P1 process is started (S) by the Task Manager regarding the status of the IPS2 and ITS1, which are the output stacks for the P1 process. The Task Manager never starts a Process or a Task when one of its output resource is full. When T11 is running (P1 active), the External Storage is accessed by active states when energy is provided (Void states may be used by subsequent tasks or processes, as described previously). Information retrieved from External Storage or modified by logical operations of the task itself can be saved in a Working Process Area (WPA 330, 340) for use by a subsequent state of the same task. Each WPA is dedicated to a process, so that even 2 or more running processes may save their own working pages for use in further states. During the Task execution and before End of task (E signal sent back to the Task Manager), if necessary, a new set of information is saved by the task T11 into next ITS/IPS (Write). In a communication adapter handling an incoming data traffic we have simple tasks such as 'enqueue/dequeue'; for such tasks, as they are independent, it is not necessary to communicate information thru an ITS. The information saved are Task specific, so that the minimum information needed by next task to start a task is saved in the IPS/ITS. The information are saved into ITS1 or IPS2 depending upon parameters found during the task execution. At the same time, the ITS1 status lines indicate to the Task Manager that T21 of P2 is now startable. The Task T21 in the P2 process is started (S) by the Task Manager according to the status (not Full) of the ITS2 stack, which is the T21 output stack. ITS2 will be written before end of task (E to Process Manager) with the information needed by T22 task. The Task T22 in the P2 process is started (S) by the Task Manager according to the status (not Full) of the OUS2 stack, which is the T22 output stack. OUS2 will be written before end of task (E to Task Manager) with the final processed data packet. Tasks T21 and T22 are, in P2 process case, started by the Task Manager on an alternate basis. These two tasks cannot run simultaneously because of the sharing of the same type of information in the External Storage. When T21 or T22 of P2 is running, the External Storage is accessed by active states. Data retrieved from External Storage or modified by logical operations of T21 or T22 tasks, can be saved in P2 WPA (340) for use by a subsequent state of the same Task. P2 WPA (340) is dedicated to P2 process, so, used alternately by T21 then T22. The processed packet is ready in the output stack OUS2 for delivery through the outgoing data flow for further processing not considered here.

Figure 4:
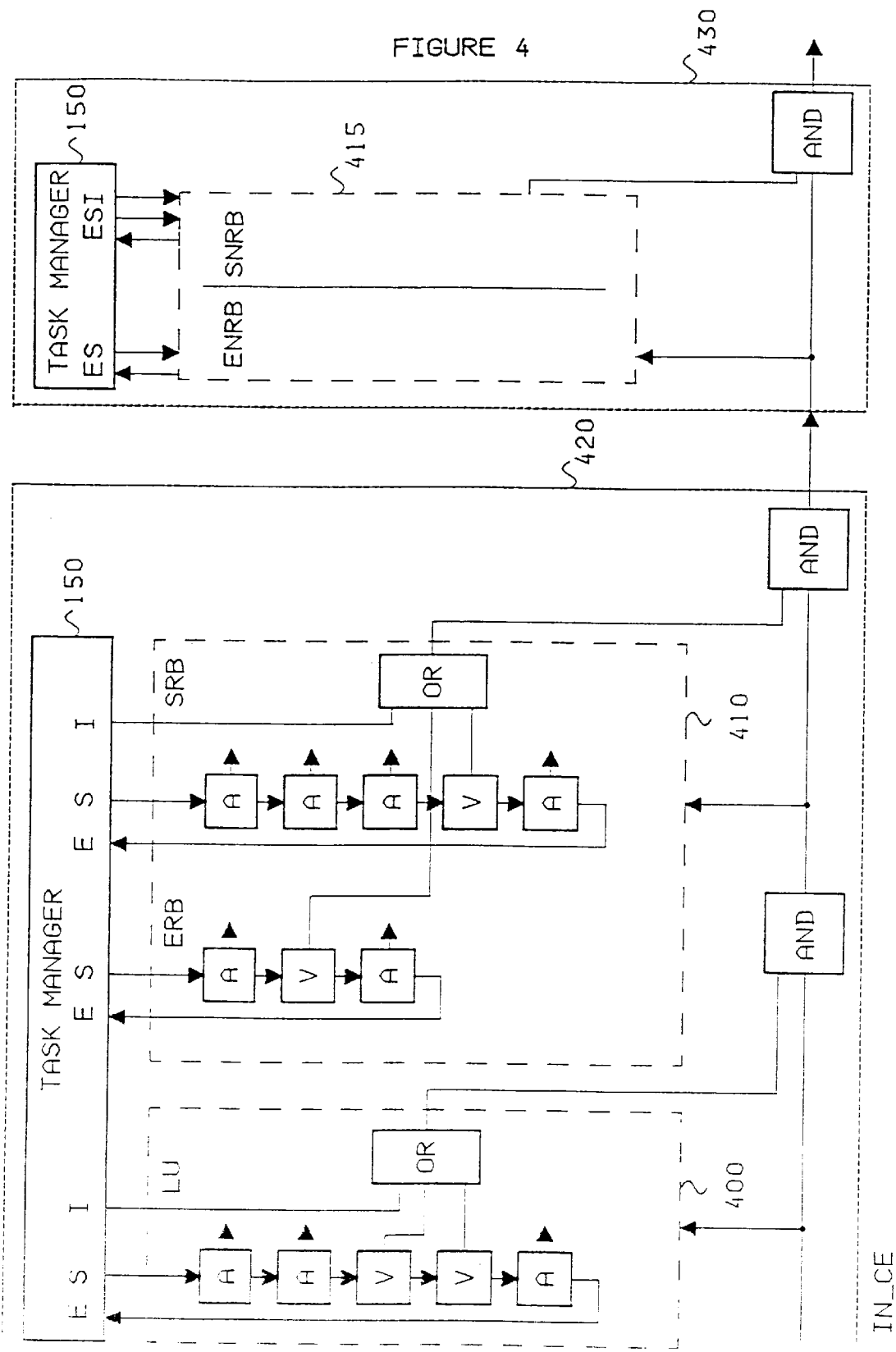
FIG. 4 shows the energy cascading mechanism applied to the support of the RB and NRB ATM services in an ATM network node.

FIG. 4 illustrates one simple example of process structure according to the solution of the invention applied to the ATM cell information data flow processing of the ATM layer which is implemented in the ATM node network adapters. This structure is for processing of ATM traffic having only two different levels of priority. The highest priority data flow is for ATM cell information of the ATM RB service connections. The lowest priority data flow is for ATM cell information of the ATM NRB service connections. The highest priority task is the Look Up (LU) task for identifying the ATM service to which the incoming data belongs to. The identification is performed by reading the VPI/VCI (Virtual Path Identifier/Virtual Channel Identifier) of the ATM cell header. In the case where the data belongs to the highest priority service data flow, they are processed by the two tasks Enqueue Reserved Bandwidth traffic (ERB) and Schedule Reserved Bandwidth traffic (SRB). In the case where the data belongs to the lowest priority service data flow, they are processed by the two tasks, Enqueue Non Reserved Bandwidth traffic (ENRB) and Schedule Non Reserved Bandwidth traffic (SNRB). In FIG. 4 the process structure proposed comprises three processes and two sets of processes. The first process (400) comprises the highest priority task, LU. The second process (410) has a lower priority than the first one and comprises two processes ERB and SRB dealing with RB data flow, the highest priority data flow. These two tasks are exclusive as they process common data which are the RB connection queues. LU task being under the pressure of the incoming network lines and feeding ERB which in turn feeds SRB, LU process (400) has a higher priority than ERB-SRB process (410) in the first set of processes (420). The tasks ENRB and SNRB deal with NRB data flow, they are exclusive as they process common data which are NRB connection queues. They are set in one process (415) forming the one-process set of processes (430); this set of processes (430) having a lower priority than the first set of processes (420).

Figure 5:
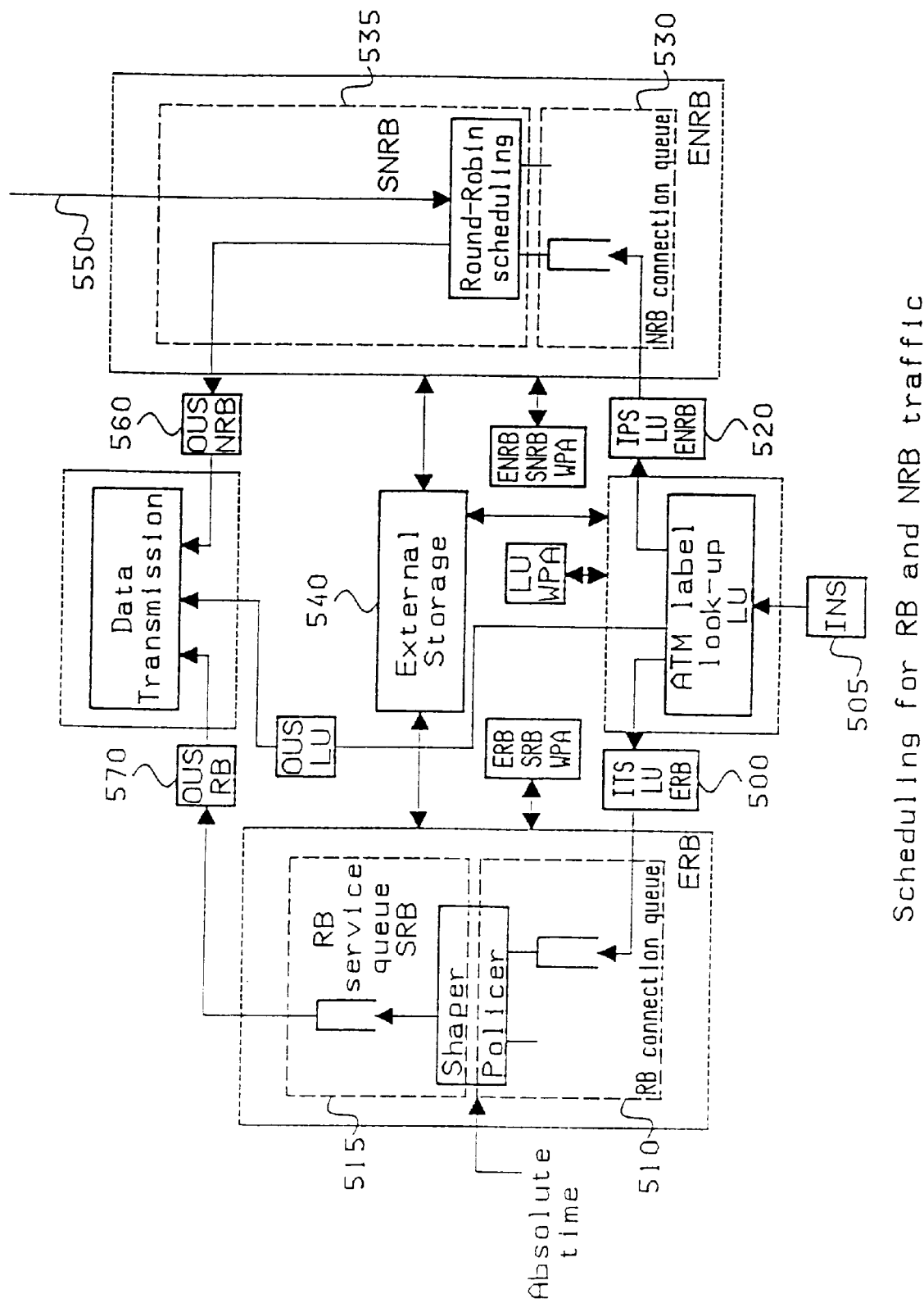
FIG. 5 illustrates the architecture proposed for processing of the ATM RB and NRB service data flow.

FIG. 5 describes the architecture for processing of the RB and NRB data flows according to the process structure of FIG. 4 and the example of storage organization illustrated in FIG. 3. The type of traffic the data stacked in the INS stack (505) belongs to depends on the VPI/VCI field of the cell header. The data for RB traffic is stored in the LU-ERB ITS (500), the data of NRB traffic is stored in the LU-ENRB IPS (520). If the cell belongs to the first priority flow, then the task feeds the inter-task stack (500), flip-flop storage unit in the preferred embodiment, (500), so that the ERB task, (510), in charge of queuing the incoming data of first the priority flow can be started. In the case the data belongs to the low priority flow, the task feeds the Inter-Process NRB queue, (LU-ENRB 520), so that the ENRB task, (530), in charge of queuing the incoming cells of the low priority flow can be started. In the preferred embodiment, the low priority flow is a Non Reserved Bandwidth traffic whose aggregate incoming rate is not controlled according to a traffic contract at connection setup and hence is completely unknown. Therefore the inter-process entity between the look-up LU and the ENRB enqueue task, LU-ENRB IPS (520), needs to be very large, a queue in the preferred embodiment. When the LU-ERB inter-task stack (500) is not empty, the ERB task queues the data referenced in the stack, in the appropriate connection queue. Similarly, when the LU-ENRB IPS (520) is not empty, the ENRB task queues the data referenced in the LU-ENRB IPS (520) queue, in the appropriate connection queue. The SRB task (515) is in charge of dequeueing data from the priority flow to feed the outgoing data stack for RB traffic, OUSRB (560). SRB task can have many different implementations. In the case where the priority flow makes use of a single FIFO queue, SRB starts as soon as said queue is not empty. An alternate implementation is the case where the priority flow has a dedicated queue per connection in which case SRB can be a shaper i.e. SRB schedules every connection at times derived from absolute timing and in accordance with the traffic contract of the various connections. Well known shaper implementations are based on calendar scheduling. The SNRB task (535) is in charge of dequeueing data from the low priority flow to feed the outgoing stack for NRB traffic, OUSNRB (560). Data Transmission task performs the physical transmission of the data on the outgoing data link. This unique task forming a process is a process external to the sets of processes considered in the preferred embodiment. The OUSRB and OUSNRB stacks are inter process stacks towards the external process. Since the low priority traffic is not scheduled in advance and may, unlike the priority one, exceed the outgoing link capacity, a flow control mechanism is implemented (550) whose goal is to limit the number of ready i.e. dequeued, outgoing cells from the low priority traffic. SNRB task can have many different implementations. In the case the priority flow makes use of a single FIFO queue, SNRB starts as soon as said queue is not empty. An alternate implementation is the case where the priority flow has a dedicated queue per connection in which case SNRB can be a well-known round robin or weighted round robin scheduler. For the two priority flows, the tasks LU, ERB, SRB, ENRB, SNRB are sharing the access to the External Storage (540) holding the look-up table, connections control blocks and queues pointers.

Figure 6:
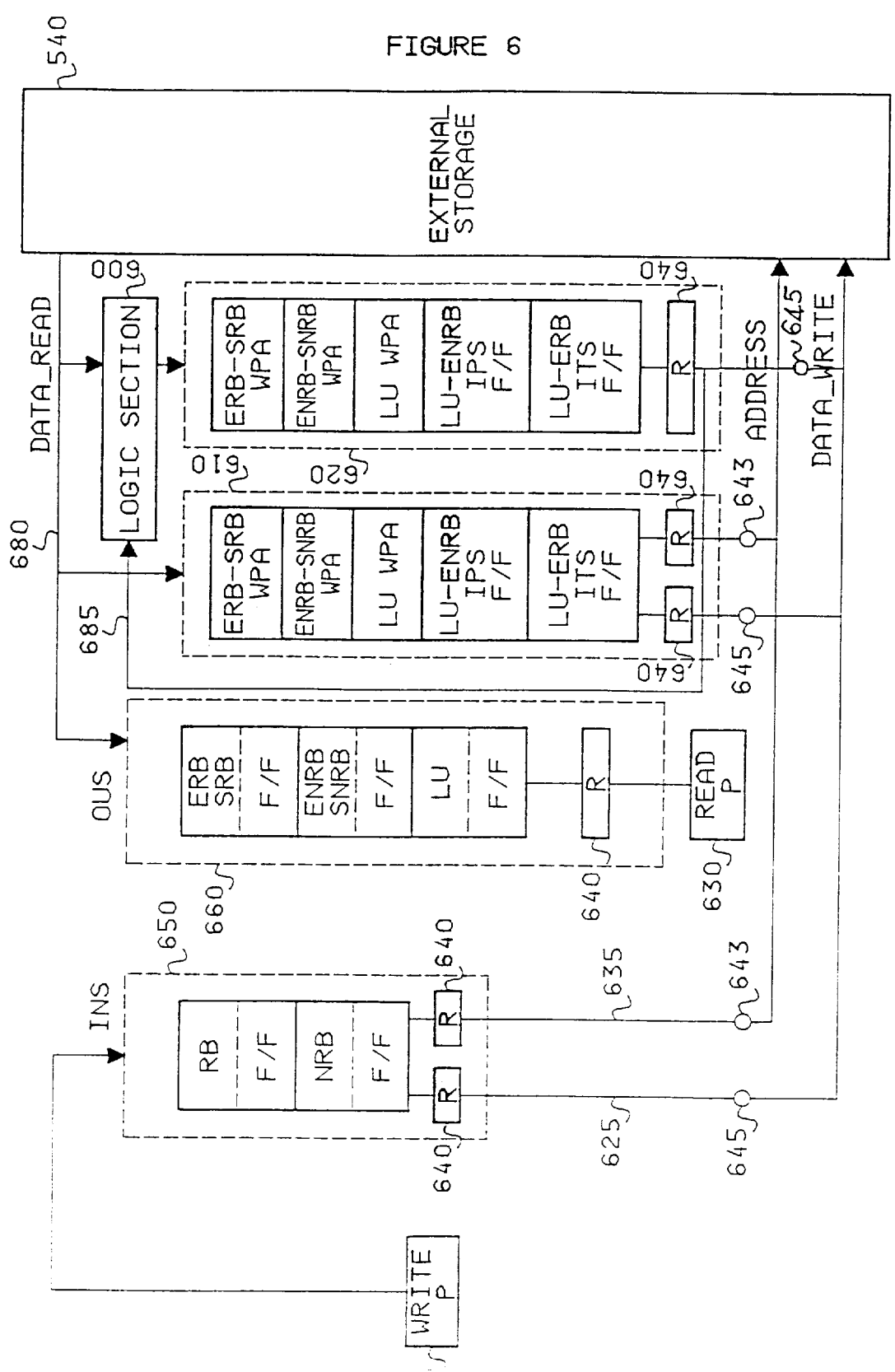
FIG. 6 illustrates a hardware implementation of the two prioritized processes for the support of two ATM services, RB and NRB in an ATM network node.

FIG. 6 depicts the physical storage organization according to the logical storage organization described in FIG. 3 applied to the 2 priority data flow processing, RB and NRB, in the ATM layer of an ATM network adapter. As described previously, the two processes share the same External Storage (540), which is accessed by an address bus (ADDRESS, 635) and a data bus (DATA_WRITE 625). The shared external storage is used to store the connection information used by the LU task to identify the information cell. The external storage is also used in the preferred embodiment to store the RB and NRB connection queues as described in FIG. 5. A same Logic Section (LS 600) is shared by all the tasks. The cell information are received from an external processing (WRITE P 620) and stored in the INS storage unit. The cell information, being read by an external processing (READ P 630) are stored in the OUS storage unit. With the implementation illustrated in FIG. 6 the working areas ERB-SRB WPA, ENRB-SNRB WPA, LU WPA, LU-ENRB IPS (Flip-Flop mode), LU-ERB ITS (FLIP-FLOP mode) are spread over three RAM units. For reasons of simplification in drawing FIG. 6 only one RAM unit (610) appears; in the real implementation two RAM units (610) having the same structure are necessary, one dealing with the addresses of the External Storage (540), one dealing with the data of the External Storage (540). Tn order to allow pipelining of arrays for INS, OUS, IPS and ITS these arrays has been implemented, for the preferred embodiment as Flip-Flop. An additional RAM unit (620) has the same structure than the first RAM unit(s) (610) and comprises processed data issued from Logical operations (+1, −1, Compare, etc . . .) executed on the Logic Section (600) shared between all the tasks. Data read from the additional RAM unit (620) is first stored in a register (640) and then sent via the intermediate combinational bus (685) for combinational operations or written in the external storage via a WRITE multiplexer (645) and the DATA_WRITE bus. The communication between the first RAM unit (610) and the External Storage comprises two output registers (640), one for storing ready addresses, one for storing ready data these buses being themselves connected to two WRITE multiplexers (645) one for writing on the ADDRESS bus (635) and the other for writing on the DATA_WRITE bus (625). The RB/NRB data received from the WRITE process (620) is written in the FLIP-FLOP area of the INS (650) dedicated to RB/NRB traffic; LU reads INS and the external storage (540); LU task stores intermediate data in the LU WPA areas. During task execution data is read from the External Storage (540) on the DATA_READ bus(680). The data is sent to the working area (610) and to the Logic Section by the LU, ERB, SRB, ENRB, SNRB tasks; the data is then sent to the OUS area (660) when processed for having it ready for an external READ P process (630). It is noted that the processed data is either the RB and NRB traffic scheduled by ERB, SRB, ENRB or SNRB tasks either specific information such error messages sent by LU task.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for processing, in a network equipment, data flows received at media speed and having different levels of priority; said processing comprising elementary tasks (T11, T21, T22) sharing at least one Arithmetic and Logic Unit (600) at least one storage unit (540,320) allowing interruption of a lower priority task by a higher priority task, one task comprising successive states corresponding to one clock cycle which are either active or non-active; said method comprising the following steps:

(a) prioritizing tasks and grouping, into consequently prioritized processes (100, 110, 400, 410, 430), at least one task, two tasks in a same process being never active at the same time;

(b) providing the clock enable signal (IN_CE) to the highest priority process and when the clock enable signal becomes active, activating a task of the process according to a process task management (150) algorithm;

(c) when an active task is in a non-active state (VOID) or if no task is active in the process, then providing the clock enable signal to the immediately lower priority process;

(d) at the end of an executing task state, is one task of a higher priority process becomes active and the next state to be executed is not a non-active state, performing the previous providing step.

2. The method of claim 1 further comprising a step for defining per process a working storage area (330, 340); a step for saving in said working storage area, each time a task is interrupted by a higher level process, the intermediate data necessary for restarting the task.

3. The method of claim 1 or 2 further comprising communication storage area between two tasks (500, 520) of two different process or between two processed and accessed by all the tasks of the two processes said communication storage areas being alternatively read and written by one task at a time.

4. The method of claim 3 where the communication storage area is organized in Flip/Flop mode.

5. An apparatus for supporting, in a network equipment, processing data flows received at media speed and having different levels of priority; said processing comprising elementary tasks (T11, T21, T22) executed by finite state machines (FSM) sharing at least one Arithmetic and Logic Unite (600) and at least one storage unit (540, 320) allowing interruption of a lower priority FSM by a higher priority FSM, one FSM comprising successive states corresponding to open clock cycle which are either active or non-active; said apparatus further comprising:

prioritized FSMs grouped into consequently prioritized process (100, 110, 400, 410, 430), of at least one FSM, two FSMs of a same process being never active at the same time;

receiving the clock enable signal (IN_CE) to the highest priority process and, when the clock enable signal becomes active, activating a FSM of the process according to the algorithm of one process task management (150);

oring in each process the process idle signal activated when no FSM is active in the process with the non-active-state signals of the FSMs activated when the FMS s active and the state is non-active;

starting from the highest priority process, anding each ored signal resulting from the immediately higher priority process with the clock _anable signal entering the immediately lower priority process.

6. The apparatus of claim 5 further comprising method of claim 1 further comprising a step for defining per process a working storage area (330, 340); a step for saving it said working storage area, each time a task is interrupted by a higher level process, the intermediate data necessary for restarting the task.

7. The apparatus of claim 5 or 6 comprising communication storage area between two tasks (500, 520) of two different processes or between two processes and accessed by all the tasks of the two processes said communication storage areas being alternatively read and written by one task at a time.

8. The apparatus of claim 7 where all the communication storage area are sharing Flip/Flop static RAM units.

9. A receiving network adapter comprising at least one network physical interface device for receiving multipriority data flows from output network lines, an apparatus according to any claim from claim 5 to claim 8 for processing said multipriority data flows into processed multipriority data flows a device for sending the processed data flows onto an internal bus of the adapter.

10. A transmitting network adapter comprising an internal bus from which are received multipriority data flows, an apparatus according to any claim from claim 5 to claim 8 processing the received data flows and at least one network physical interface device on which said processed multipriority data flows are transmitted onto the output network lines.

* * * * *

UNITED STATES PATENT AND TRADEMARK OFFICE
CERTIFICATE OF CORRECTION

PATENT NO. : 6,003,060
DATED : December 14, 1999
INVENTOR(S) : Ange Aznar, et al.

It is certified that error appears in the above-identified patent and that said Letters Patent is hereby corrected as shown below:

On the title page item [57],

In the Abstract, line 22: "costa" should read --cost--

Column 1, line 47: "blocs" should read --blocks--

Column 2, line 43: "by described," should read --be described,--

Column 2, line 61: "shoes" should read --shows--

Column 9, line 31, Claim 5: "Unite" should read --Unit--

Column 10, line 4, Claim 5: "oring" should read --storing--

Column 10, line 7, Claim 5: "FMS s" should read --FSMs--

Column 10, line 8, Claim 5: "anding" should read --adding--

Column 10, line 9, Claim 5: "ored" should read - --stored--

Column 10, line 10, Claim 5: "anable" should read --enable--

Signed and Sealed this

Twenty-eighth Day of November, 2000

Attest:

Q. TODD DICKINSON

*Attesting Officer*  *Director of Patents and Trademarks*